United States Patent [19]
Lantz et al.

[11] Patent Number: 5,173,940
[45] Date of Patent: Dec. 22, 1992

[54] KEYBOARD ACTIVATED SCREEN BLANKING

[75] Inventors: Kurt C. Lantz, Spring; Randall L. Hess, Houston, both of Tex.

[73] Assignee: Compaq Computer Corporation, Houston, Tex.

[21] Appl. No.: 719,199

[22] Filed: Jun. 21, 1991

[51] Int. Cl.⁵ .............................................. H04K 1/00
[52] U.S. Cl. ........................................... 380/25; 380/4
[58] Field of Search .................................. 380/25, 4

[56] References Cited

U.S. PATENT DOCUMENTS

| | | | |
|---|---|---|---|
| 3,890,601 | 6/1975 | Peitrolewicz | 380/25 |
| 4,800,590 | 1/1989 | Vaughan | 380/25 |
| 4,942,606 | 7/1990 | Kaiser et al. | |
| 4,959,860 | 9/1990 | Watters et al. | |

Primary Examiner—Thomas H. Tarcza
Assistant Examiner—David Cain
Attorney, Agent, or Firm—Pravel, Gambrell, Hewitt, Kimball & Krieger

[57] ABSTRACT

A keyboard controller which scans entered input sequences for an input sequence to activate a display blanking feature. A password and particular hot key are loaded by the system microprocessor. The keyboard controller then scans until the designated sequence is activated. The display on the monitor is blanked until a password sequence is entered. The password mode may be directly activated from the system microprocessor. The display blanking feature is especially useful in conjunction with a keyboard password lock.

13 Claims, 7 Drawing Sheets

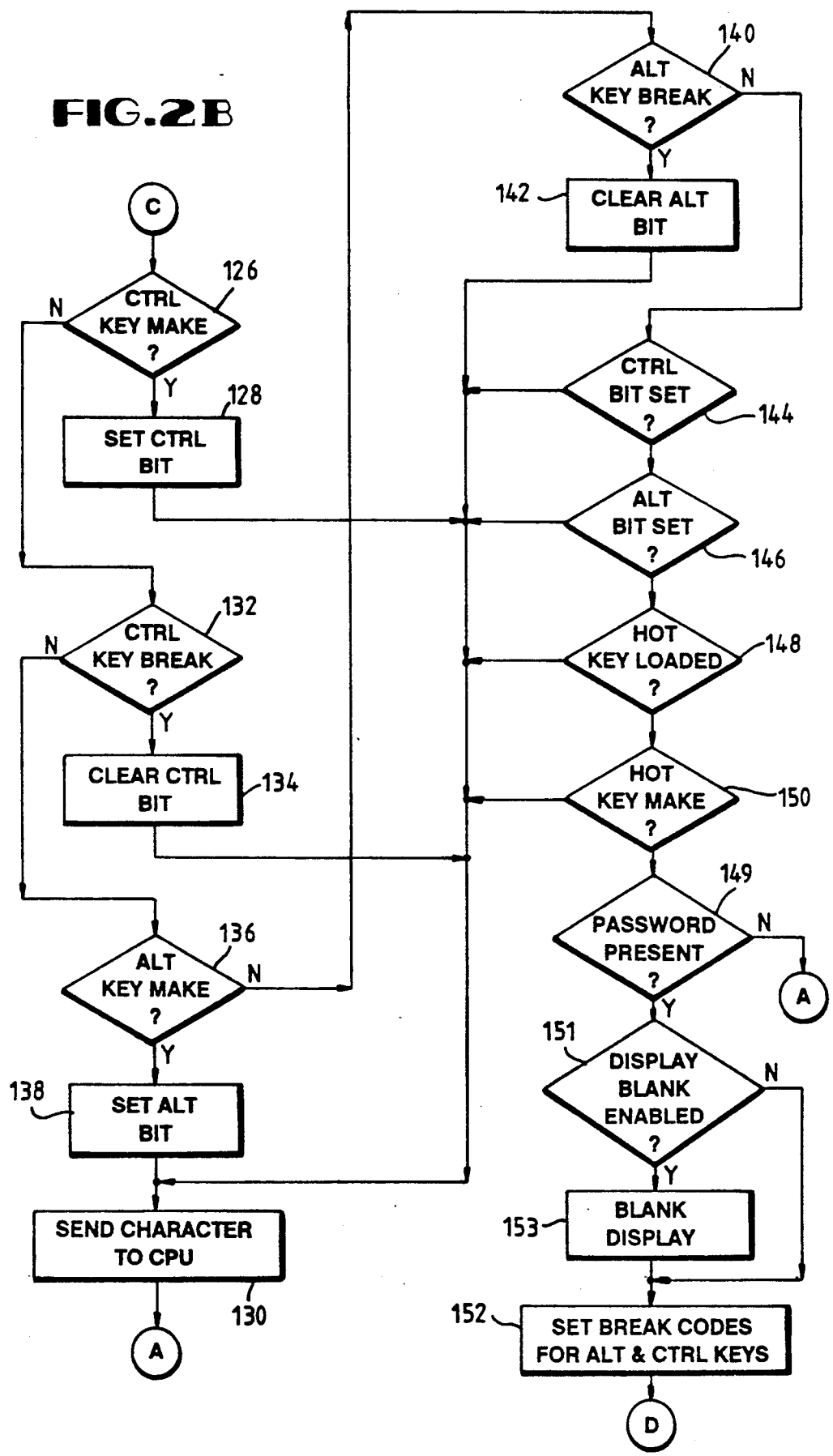

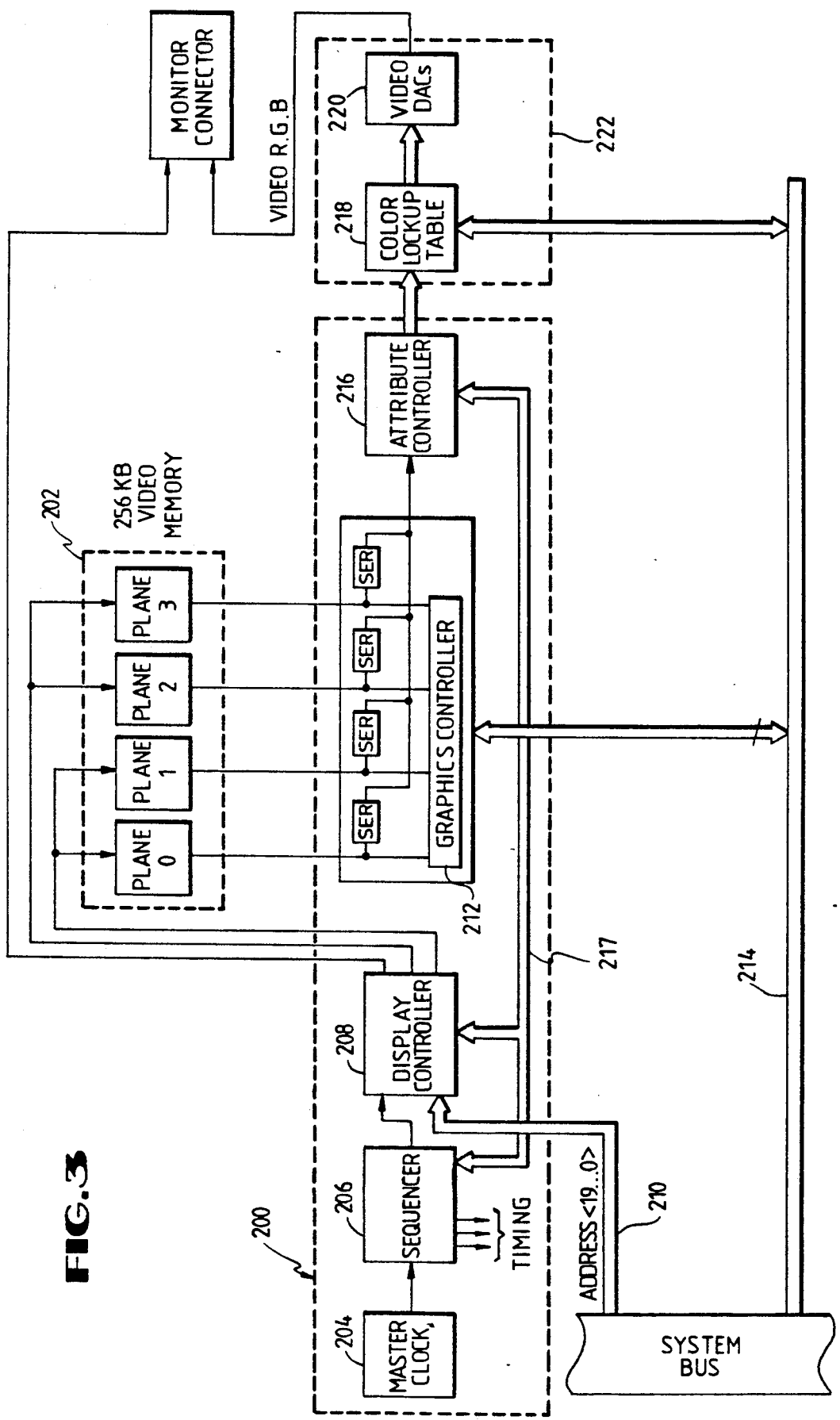

KEYBOARD ACTIVATED SCREEN BLANKING

BACKGROUND OF THE INVENTION

1. Field of the Invention

The invention generally relates to monitors used with computer systems and more particularly to a method and apparatus for blanking the display upon receipt of a key stroke until a password is entered.

2. Description of the Related Art

Personal computer systems are becoming more elaborate and are being used for more critical functions. For example, originally personal computers were only used for very simple word processing tasks and spreadsheet applications of relatively limited complexity. Today however, personal computers are being used to form elaborate network systems, both as the work stations and as the file servers and applications of great sensitivity or complexity are being executed. As the complexity of the various applications has gone up dramatically from a simple small spreadsheet application to extremely complex spreadsheets, so has the time required to perform the calculations. In many cases it is convenient for the user to do other tasks and leave his office, leaving the computer unattended. This unattended state is quite common in file server applications of the computer.

While the operator is away, the monitor continues to display. The monitor often does not, however, display anything of significance while the program is running. Because the operator is not watching the monitor, the display serves little purpose while the computer is performing its task and the operator is absent from the station. If the periods are extended, it is possible that the displayed image could be permanently imprinted or burned onto the monitor. Alternatively, sensitive data could be on the monitor or could be displayed while the operator is absent. It is undesirable to have this sensitive data always on display. For these reasons, it is desirable to blank the display from the monitor when it is not needed without turning the monitor off.

Screen blanking programs are well known in the art. Conventionally a screen blanking program blanks the screen after a set period of inactivity on the keyboard. Two interrupt routines, the timer interrupt and the keyboard interrupt, are changed to effect the blanking. In a computer's normal configuration, the timer interrupt is asserted periodically. The keyboard interrupt, on the other hand, is asserted every time a key is depressed or released on the keyboard. When either interrupt is asserted, the execution of the main code is suspended, and the processor looks in an interrupt vector table to find the starting address of the interrupt routine. The processor then branches to the appropriate address, runs the interrupt routine, and then returns to executing the main code.

The screen blanking program alters this progression. First, the program inserts a sequence in memory so that whenever the keyboard interrupt is asserted, a counter is reset. This means that every time a key is depressed or released on the keyboard, the counter is cleared. Next, a sequence is included so that whenever the timer interrupt is asserted, the counter is incremented by one. The counter value therefore reflects the amount of time that has passed since the last key strike on the keyboard. In the new timer sequence the counter value is compared to a previously set value that indicates the duration before the operator wants the screen to go blank. If the set value exceeds the counter value, the processor continues with the usual timer interrupt routine. If the counter value equals or exceeds the set value, however, the processor sends a command to blank the screen, and the display is blanked until the keyboard is used again. The next time a key on the keyboard is depressed, a keyboard interrupt is asserted, resetting the counter and bringing the display back onto the screen at the next timer interrupt.

Using a screen blanking program, the screen is automatically blanked while the keyboard (and presumably the computer) is idle. A disadvantage, however, is that anyone having access to the computer has access to the data on the screen by simply striking any key on the keyboard.

Another problem with the common screen blanking program is the delay before the screen is blanked. If the user wishes to blank his screen before leaving the station, he has no option but to wait until the delay has lapsed. Thus, it would be desirable to have a system in which the screen could be blanked at the user's command.

A program to blank the screen at the user's command would be executed by the system microprocessor. When the program was run, the screen would be blanked and the computer would scan the keyboard signals, looking for a password to reactivate the display. Because it is a separate program, however, the program could not be initiated while another program had control of the system. This problem could be avoided by using the system processor and a hot key scanning sequence. But certain operating systems block access to the keyboard interface. Consequently, signals between the keyboard and the main processor are blocked and the screen blanking process could not be initiated until the main program had run its course.

Therefore it is desirable to be able to blank the display on user command with out requiring the services of the system microprocessor.

In addition, security in the personal computer either locally or on a network is always of concern. For instance, if an administrator's station is connected into a network, the administrator will have various rights which other users are not allowed. If an ordinary user were to gain access to data in the network via the administrator's station, disastrous results could occur. Alternatively, if a program is in the midst of performing a very long recalculation and the operator wishes to leave for a period of time, another party could come in and see the computer doing apparently nothing and hit a key on the keyboard, interrupting the program in midstream. To prevent these mishaps, a user may lock his keyboard using a keyboard password lock as described in patent application Ser. No. 525,490, entitled "Keyboard Password Lock", filed on May 18, 1990, which is hereby incorporated by reference. The password lock prevents access to the computer through the keyboard without a password, yet it does not interrupt the main processor functions as it performs its task. While the keyboard is locked, the display is usually unnecessary, and is again needlessly wasting its operational life. For these reasons it is desirable to be able to blank the screen so that monitor life is not reduced and sensitive data not displayed and to lock access so that information cannot be obtained without clearance.

SUMMARY OF THE INVENTION

In a computer system according to the present invention, the display can be blanked so that it stays blank until a password is entered on the keyboard. In the preferred embodiment, a password and a key to complete a hot key sequence are downloaded into the keyboard interface, which is continually scanning the input sequence of key codes received from the keyboard. If a particular sequence of key codes, in the preferred embodiment, the CRTL, ALT and L make codes, is present, this is an indication to the keyboard interface that password protected or active mode should be activated. If a particular bit has been set, the video blanking is enabled as well. The keyboard interface on its own then proceeds to block all incoming key codes and blanks the display until the complete password is entered. The keyboard interface then scans the received codes to see if the password is being entered. If the password is not entered, the scanning continues. If the password is entered, the password protected or active mode is exited. After the password active mode has been exited, the keyboard becomes active and the display is returned to the monitor. Thus, the screen can be blanked and the keyboard locked at the user's command without intervention of the system microprocessor.

BRIEF DESCRIPTION OF THE DRAWINGS

A better understanding of the present invention can be obtained when the following detailed description of the preferred embodiment is considered in conjunction with the following drawings, in which:

FIGS. 2A, 2B and 2C are flowchart illustrations of operating sequences of the keyboard controller of FIG. 1 according to the present invention;

FIG. 3 is a more detailed block diagram of the monitor and the video controller of FIG. 1.

DETAILED DESCRIPTION OF THE PREFERRED EMBODIMENT

Figure 1:
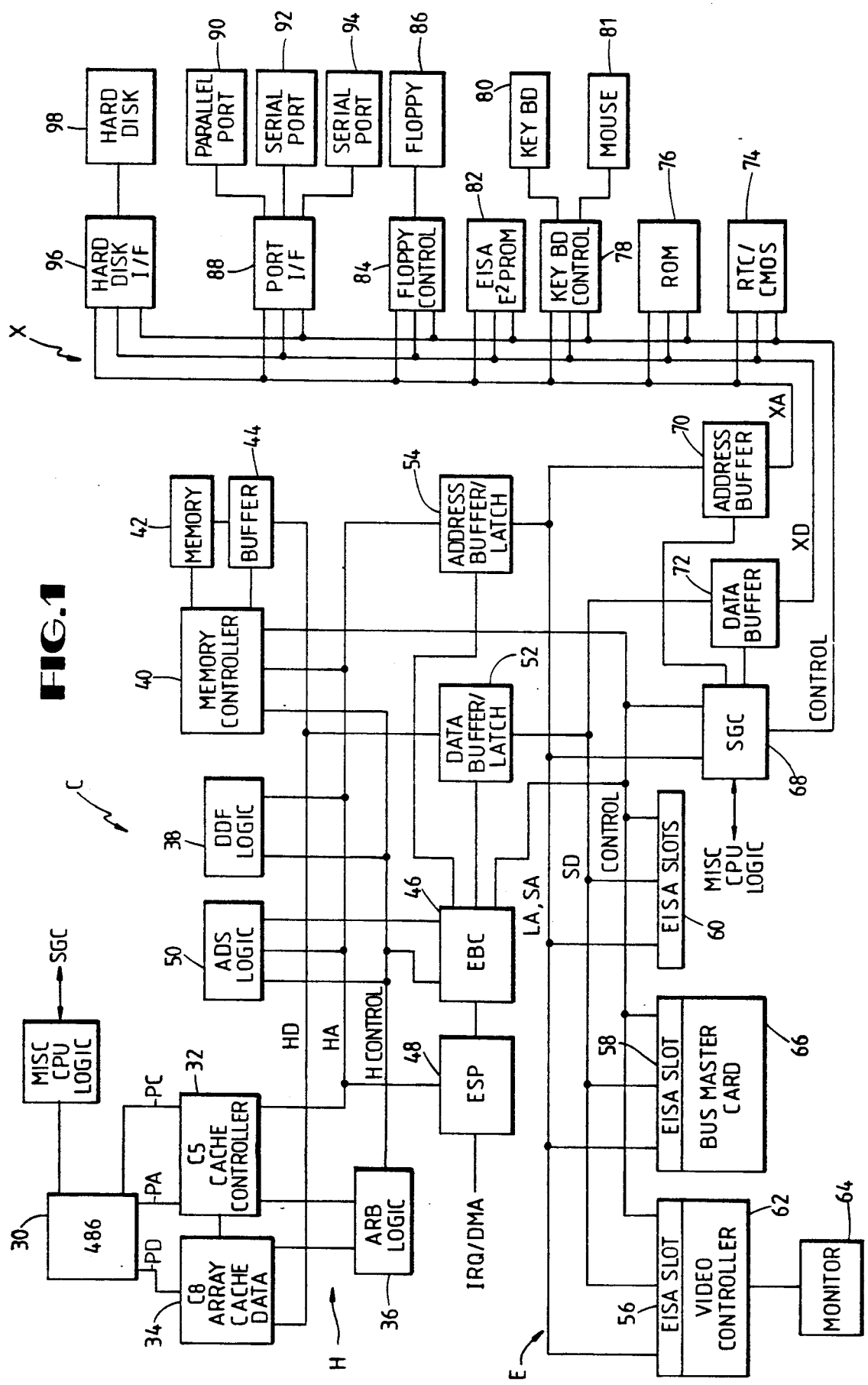
FIG. 1 is a block diagram of a computer incorporating the present invention.

Referring now to FIG. 1, a computer system generally referred to by the letter C incorporating the present invention is shown. The foundation of a computer system C according to the present invention is a microprocessor 30, preferably the i486 from Intel Corporation (Intel). Connected to the microprocessor 30 is a cache subsystem comprising a cache controller 32, preferably the C5 cache controller by Intel, and an array of cache data RAM's 34, preferably the C8 data RAM's also from Intel. The microprocessor 30, the cache controller 32 and the cache data RAM's 34 are connected as indicated and specified by Intel. To this end the processor data bus PD is connected to the data RAM's 34 and the processor address bus PA and the processor control bus signals PC are connected to the cache controller 32. The cache controller 32 and the cache data RAM's 34 are also connected by various control signals.

The cache controller 32 and the cache data RAM's 34 are coupled to a bus generally referred to as the host bus H which includes a host data bus HD portion, a host address bus HA portion and a host control bus HCONTROL portion. Arbitration logic 36 produces some control signals in the HCONTROL bus from signals provided by the cache controller 32 and the cache data RAM's 34. The HCONTROL bus includes signals such as the memory read or write signal, the memory or input/output signal, various address and data strobes and so on as commonly utilized by the various other elements in the computer system C.

Connected to the host bus H is a memory subsystem including data destination facility (DDF) logic 38, a memory controller 40, memory 42 and a memory data buffer 44. The DDF logic 38 provides address translation and memory module activation and is more completely described in U.S. patent application No. 431,666 filed Nov. 3, 1989 and in its European Patent Office counterpart having an application number of 90 311 749.7 and a filing date of Oct. 26, 1990, which was published on May 8, 1991, both of which are hereby incorporated by reference. The memory controller 40 provides the various control functions necessary to allow the various units operating on or over the host bus H to interact with the actual memory devices 42. The memory 42 is comprised of a series of page mode dynamic random access memories (DRAM's) arranged in an interleaved format. The memory controller 40 includes the necessary functions to control the operation of the DRAM's and of the data buffer 44.

In the preferred embodiment, the computer system C utilizes the EISA or Extended Industry Standard Architecture for the external bus. The EISA bus is generally referred to by the letter E in FIG. 1. The EISA bus E is comprised of several portions, the LA and SA address buses, the SD data bus and the control bus. A bus controller 46 referred to as the EBC, provides certain of the necessary control functions between the host bus H and the EISA bus E. Connected to the EBC 46 is the EISA system peripheral (ESP) 48, which includes various timers, the direct memory access (DMA) controller and the interrupt controller logic of the computer system C. Also connected to the EBC 46 is ADS or address strobe logic 50. The ADS logic 50 is used to convert certain differences in the various strobes from the cache controller 32 to those necessary for use by the EBC 46. The EBC 46 controls a data buffer/latch 52 connected between the host data bus HD and the external data bus SD and an address buffer/latch 54 connected between the host address bus HA and the external address buses LA and SA in the EISA bus E. Connected to the EISA bus E are a series of EISA slots 56, 58 and 60 according to the EISA convention. In the preferred embodiment, the EISA slot 56 is preferably a special slot having a pin adapted for special operations with a video controller 62. A monitor 64 is connected to the video controller 62. Additionally in the disclosed embodiment, one of the general purpose EISA slots 58 includes a bus mastering card 66 which operates according to the EISA specification. The bus mastering card allows high performance data transfers over the EISA bus E. As an example, the bus master card 66 may be a high performance disk controller which transfers information from the attached hard disk devices directly into the memory 42. This operation is controlled in part by the bus mastering card 66, in part by the EBC 46 and in part by the memory controller 40. It is noted that the bus master card 66 could be either an EISA bus master or an ISA bus master. The remaining EISA slots are generally referred to by the number 60 and in a typical design would include up to 6 slots for insertion of either other EISA cards or conventional ISA cards as readily available.

A fourth general bus referred to as the X bus is also present in the computer system C. The X bus is developed from the EISA bus E by means of a system glue chip (SGC) 68, which performs numerous address decoding operations; an address buffer 70 and a data buffer 72. The SGC 68 controls the operation of the data buffer 72 and the address buffer 70, as well as providing various strobes over an X control bus to the miscellaneous devices contained on the X bus. The first item contained on the X bus is a real time clock (RTC) 74, which contains the necessary CMOS memory and clock functions utilized in the computer system C. A read only memory (ROM) 76 includes the necessary basic operating software utilized in the computer system C and communicates over the X bus. A keyboard controller 78 is connected to the X bus and has connected to it a keyboard 80 to allow data entry. Optionally the keyboard controller 78 can include a second interface for a pointing device or mouse 81. An electrically erasable programmable read only memory (EEPROM) 82 is connected to the X bus to retain the extended set up information required for an EISA system relating to board configuration. A floppy controller 84 is connected to the X bus and has connected to it a floppy disk drive 86. A port interface circuit 88 is connected to the X bus and provides a parallel port 90 and two serial ports 92 and 94. Further, a hard disk interface 96 is connected to the X bus, with a hard disk 98 being connected to the interface 96. This list of peripheral devices is exemplary and numerous other peripheral devices could be developed either on the X bus or on the EISA bus E.

This description of the preferred embodiment of the computer system C is exemplary only and other variations in the computer system design could of course be developed.

Figure 2A:
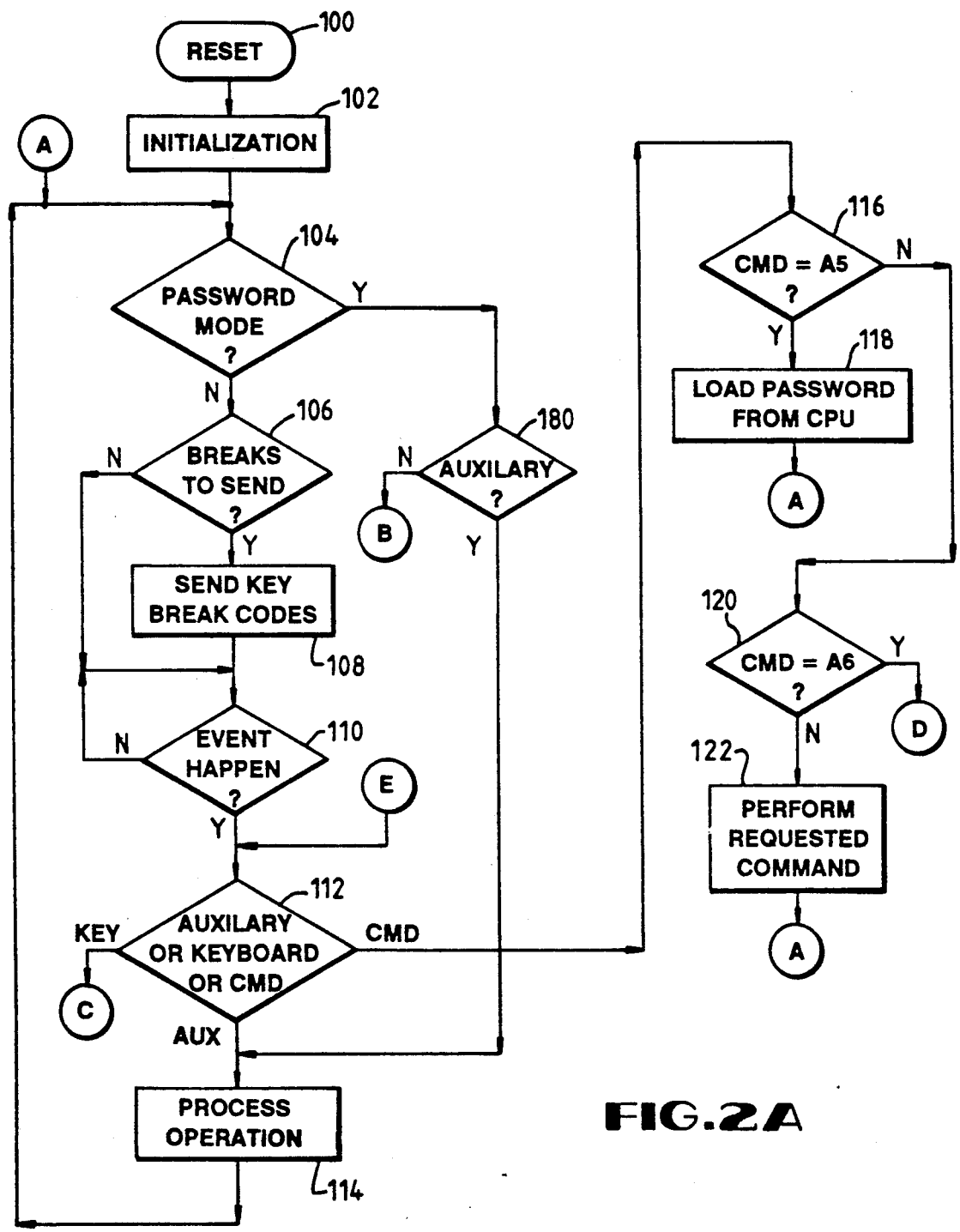

Proceeding now to the operation of the keyboard controller 78, operation commences at the reset sequence 100 (FIG. 2A) of the keyboard controller 78. Control commences at step 102 where various initialization activities are performed. Example initialization items are clearing of all memory except the password value, setting up the internal time and ports and setting up the various RAM values to be utilized during operation. Control then proceeds to step 104 where the keyboard controller 78 determines whether password protected mode is active. If not, control proceeds to step 106 where a determination is made as to whether any key break characters or codes are to be sent. In personal computers according to the IBM PC and those compatible therewith, every time a key contact is made on the keyboard 80 a make character or code is sent from the keyboard controller 78 to the microprocessor 30 and every time a key is released a break character is sent to the microprocessor 30. This way the microprocessor 30 has the capability of determining at any time which keys are actually depressed and determining the sequencing of the keys. These breaks would be present in step 106 after exiting password active mode because when entering password active mode certain keys have been depressed and passed through to the microprocessor 30 and these keys need to be released. Therefore the operating sequence 100 queues up these breaks when password protected mode is entered for transmission when password protected mode is exited. If there are breaks to send, indicating that this is the first loop after leaving password protected mode, control proceeds to step 108 where the key break codes are transmitted to the processor 30. If there were no breaks to send or the breaks have been sent, control proceeds to step 110 to determine if an event of interest to the keyboard controller 78 has occurred. These events can be either an input from the auxiliary device, commonly the mouse 81; keyboard activity, such as making or breaking of a key, or a command being received from the microprocessor 30. If an event has not occurred, control loops back to step 110 so that operation stays on step 110 until an event does occur. If an event has occurred, control proceeds to step 112 to determine if it was received from the auxiliary device 81, the keyboard 80 or is a command from the microprocessor 30. If it is an auxiliary input from the mouse 81, control proceeds to step 114 where the operation requested is performed. Control then proceeds to step 104 to form a loop.

If a command was received from the microprocessor 30, control proceeds from step 112 to step 116 where an evaluation is made if the command was as A5 command. If so, control proceeds to step 118 where the password is loaded. In this way the microprocessor 30 can load up the memory in the keyboard controller 78 with the password which has been stored in the CMOS 74 or has just been entered by the user using a utility program. Control proceeds from step 118 to step 104.

Figure 2C:
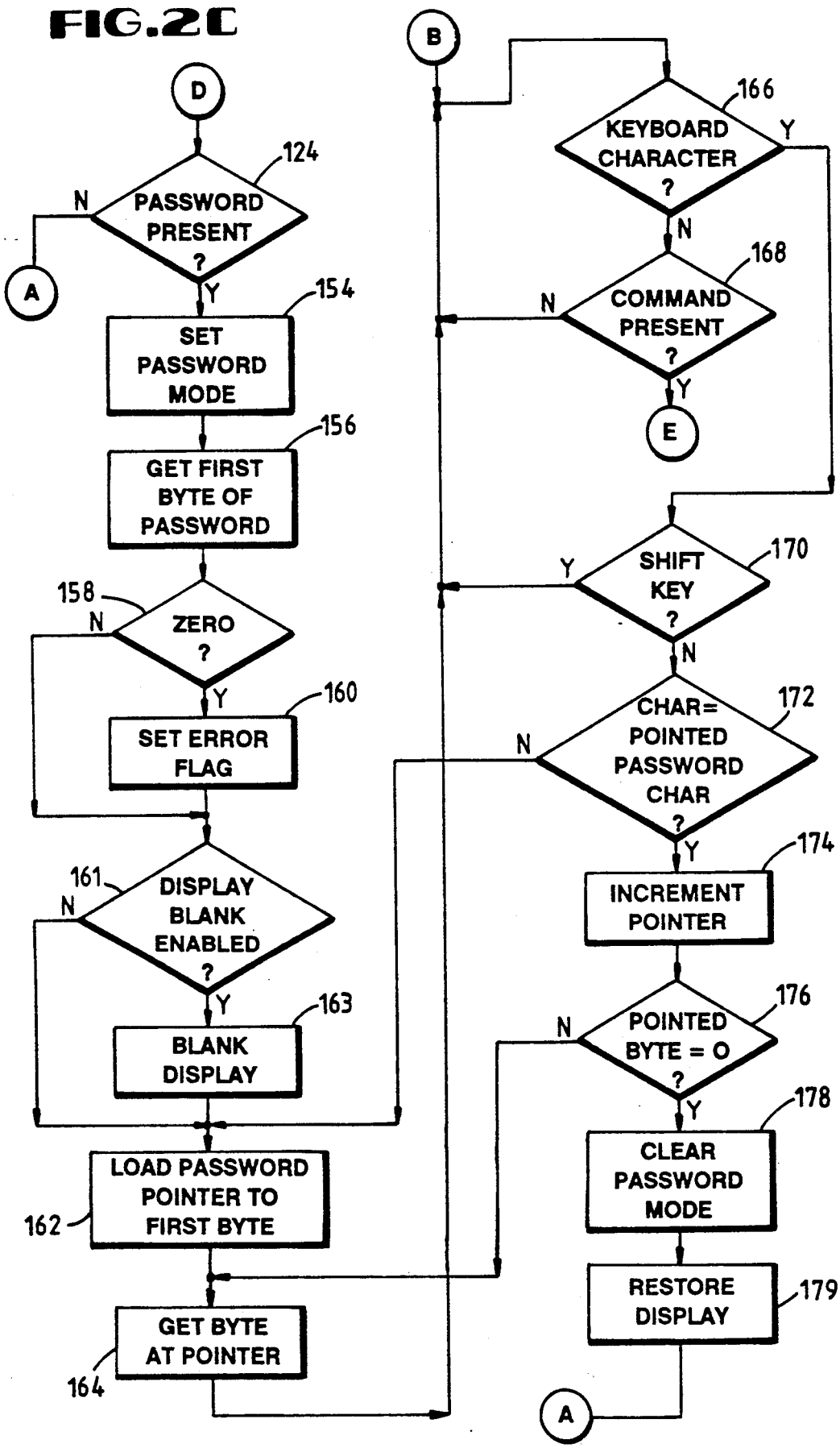

If the command was not an A5 command, control proceeds from step 116 to step 120, where a determination is made whether the command is an A6 command. The A6 command is a command for the keyboard controller 78 to directly enter password active mode and blank the display. If the command is not an A6 command, control proceeds to step 122 where the requested command is performed. One of these commands allows the microprocessor 30 to transfer a value directly to a location in the keyboard controller 78. By this method the microprocessor 78 can provide the final key, the character key, in the password protection activation sequence. There are numerous other commands which can be performed but they are generally known and are ancillary to the present invention and therefore not described in detail. After performing the requested command, control proceeds to step 104. If the command was determined in step 120 to be an A6 command, control proceeds to step 124 (FIG. 2C).

If in step 112 it was determined that keyboard activity was the basis for leaving step 110, control proceeds to step 126 (FIG. 2B). The keyboard controller 78 determines whether the event that occurred was the making of a CTRL or control key. If so, control proceeds to step 128 where a control key depressed bit is set in the keyboard controller 78. This bit is used to keep track of the various depressions of one of the keys required to establish the password activation sequence. Control proceeds from step 128 to step 130 where the character, in this case the control make key code, is transmitted to the microprocessor 30. Control then proceeds to step 104.

If in step 126 it was determined that a CTRL key was not made, control proceeds to step 132 where a determination is made if a CTRL key break code was received. If so, control proceeds to step 134 where the CTRL key depressed bit is cleared and control proceeds to step 130. If the CTRL key break character was not received in step 132, control proceeds to step 136 where a determination is made if an ALT key has been made. If so, the ALT key depressed bit is set in step 138 and control proceeds to step 130 to transmit the make character code to the microprocessor 30.

If an ALT key was not made as determined in step 136, control proceeds to step 140 where the keyboard controller 78 determines whether the received character was an ALT key break code. If so, control proceeds to step 142 where the AL key depressed bit is cleared and then control proceeds to step 130. If the ALT key break code was not received in step 140, control proceeds to step 144 to determine if the CTRL key depressed bit is set. If not, control proceeds to step 130. If so, control proceeds to step 146 where the keyboard controller 78 determines if the ALT key depressed bit is set. If not, control proceeds to step 130, while if it is set control proceeds to step 148. In step 148 the keyboard controller 78 determines if the hot key is loaded. The hot key is considered the third key in this sequence of CTRL, ALT and a character which is used to initialize entry into the password active or lock and screen blank mode purely from the keyboard. The hot key may have a certain default value, preferably stored in the CMOS 74 and provided at power up by the microprocessor 30 in addition to the password, but which can be provided or changed by a utility program. The preferred hot key is the L, but other keys can be used if desired. If the hot key has not been loaded into the keyboard controller 78, this is an indication that the hot key password protected activity is not desired and thus the sequence is aborted. Therefore if the hot key is not loaded into the keyboard controller 78, control proceeds to step 130.

If the hot key is loaded, control proceeds from step 148 to step 150 where a determination is made if the hot key make code has been received. If not, control proceeds to step 130. If so, this is an indication that the CTRL, ALT and hot keys are all simultaneously depressed, the indication that password protected and screen blank mode is to be entered. Control proceeds to step 149 to determine if a password is present. If not, control returns to step 104. If so, control proceeds to step 151, where a determination is made as to whether the display blanking feature is enabled. If so, control proceeds to step 153 to set an output of the keyboard controller 78 to cause the display to blank. If the feature is disabled in step 151 or after step 153, control proceeds to step 152 where the break codes are set for the ALT and CTRL keys. This is necessary because the ALT and CTRL key make codes have been transmitted to the microprocessor 30 in step 130 as those keys were depressed and therefore an indication of the release of these keys must be sent when key code transmission to the microprocessor 30 is resumed after exiting password protected mode because the keys will have been released to enter the password, but the release will have been completed prior to resuming transmission and so the release key codes will not have been sent to the microprocessor 30, but it is still necessary to indicate release of the keys. Therefore the break codes are loaded up for transmission in step 108. The break code for the hot key is not needed because that key make code has not been transmitted to the microprocessor 30 and therefore does not have to be undone.

Control then proceeds from step 152 to step 124 where a determination is made as to whether a password is present in the keyboard controller 78. If not, this is yet another indication that the features are not enabled and therefore control proceeds to step 104. If a password is present, control proceeds to step 154 where the password protected mode is set. Control proceeds to step 156 to obtain the first byte of the password. In step 158, the next step, a determination is made as to whether the first byte of the password is 0. If so, this an error condition and an error flag is set 160. If not, control proceeds to step 161, which is also were control proceeds from step 160. In step 161 the keyboard controller 78 determines whether the display blanking feature has been enabled. If so, control proceeds to step 163 and the display is blanked. If not, control proceeds to step 162, which is also where control proceeds from step 163. In step 162 a pointer to the first byte of the password stored in the keyboard controller 78 is loaded into a register in the keyboard controller 78 for addressing purposes. Control then proceeds to step 164 where the password byte at the pointer value is obtained for comparison purposes. Control proceeds to step 166 to determine if a keyboard character make code has been received from the keyboard 80. If not, control proceeds to step 168 to determine if a command has been received from the microprocessor 30. If not, control returns to step 168, thus forming a scanning loop between looking for keyboard characters and microprocessor commands. If a command is present, control proceeds from step 168 to step 112 for command processing.

If in step 166 it is determined that a keyboard character was depressed, control proceeds to step 170 to determine if it was shift key that was depressed. If so, control proceeds to step 166 in as much as shift keys are ignored in the password process. If it was not a shift key, control proceeds to step 172 where a determination is made as to whether the keyboard character received is equal to the password character at the pointed location. If not, control returns to step 162 wherein the password pointer is reloaded to the first byte so that scanning then recommences at the beginning of the password. If the character is equal to the pointed password character, control proceeds to step 174, where the pointer value is incremented to point to the next character in the password. In step 176 a determination is made as to whether the pointed byte has a value of 0. If so, this is an indication that the entire password has been scanned and thus received from the keyboard 80. If the pointed byte is not equal to 0, control proceeds to step 164 to continue scanning for the next password character. If the pointed byte is 0, control proceeds to step 178 where the password protected mode is cleared so that keyboard processing and transmission to the microprocessor 30 can commence and the break codes will be sent in step 108. Control proceeds to step 179 to restore the display to the monitor by resetting the output signal. Control then proceeds to step 104.

If in step 104 it was determined that password mode was active, control proceeds to step 180 where a determination is made as to whether an input was received from the auxiliary device. If so, control proceeds to step 114 and this operation is processed. If not, control proceeds to step 166 to determine if a keyboard character had been depressed, thus entering a sequence of looking for the password to enable keyboard activity.

The video blanking signal is implemented through the video controller 62. Referring now to FIG. 3, a more detailed schematic block diagram of the video controller 62 is generally shown. The video controller 62 includes a VGA ASIC 200, video display memory 202 and a RAMDAC 222. The VGA ASIC 200 includes master clock circuitry 204 which provides a clock source for the various components comprising the VGA ASIC 200. Sequencer circuitry 206 is connected to the master clock 204. The sequencer 206 takes the output of the master clock 204 and generates timing signals used by the various elements in the VGA ASIC 200. The sequencer 206 is connected to the controller circuitry referred to as the display controller 208. The display controller 208 is connected to the address bus 210 and generates the proper video memory addresses and provides horizontal and vertical synchronization and blanking signals to attribute controller logic 216 in the video controller 200. The display controller 208 provides the video memory addresses to video memory 202, which preferably comprises 512 kbytes of memory according to the preferred embodiment. Video memory 202 is preferably organized as four 128 kbyte memory arrays or planes referred to as plane 0, plane 1, plane 2 and plane 3. In text modes, plane 0, plane 1 and plane 2 hold characters, attributes and fonts, respectively. In multi-plane graphics modes, the planes can be operated upon in parallel, and each plane supplies one of the pixels color video bits, thereby speeding up pixel processing operations.

The video planes in video memory 202 supply the respective video data to a graphics controller 212 in the VGA ASIC 200. The graphics controller 212 is connected to the data bus 214, and all of the data movement between the system bus, the EISA bus E in the preferred embodiment, and the video memory planes takes place in the graphics controller 212. The graphics controller 212 is responsible for organizing the data according to the particular read/write mode and for accelerating graphics programming by performing logical operations locally on video memory contents. Data from the video memory 202 is also serialized into bit streams in the graphics controller 212. The various color video bits that are output from the graphics controller 212 are provided to the attribute controller 216 circuitry inside the VGA ASIC 200, where the video bits are processed to decode and add blanking, highlighting, and reverse video. The sequencer 206, the display controller 208, and the attribute controller 216 are all connected via a control bus 217 which allows for communication of various control signals throughout the various blocks in the video controller 200.

The color video bits output from the attribute controller 216 are provided to a color look-up table 218. The color look-up table 218 preferably comprises 256 18-bit registers, each of which defines a color derived from six bits each of red, green and blue. The respective outputs from the color look-up table 218 are provided to a digital-to-analog converter (DAC) 220, which converts the digital signals for each of the three colors, red, green and blue to a corresponding output voltage between 0.00 and 0.70 volts. The color look-up table and the DAC 220 are preferably located on one chip referred to as the RAMDAC 222, which is included in the video controller 200. The analog signals output from the DAC 220 are provided through appropriate driver circuitry to the external monitor 64.

Figure 4:
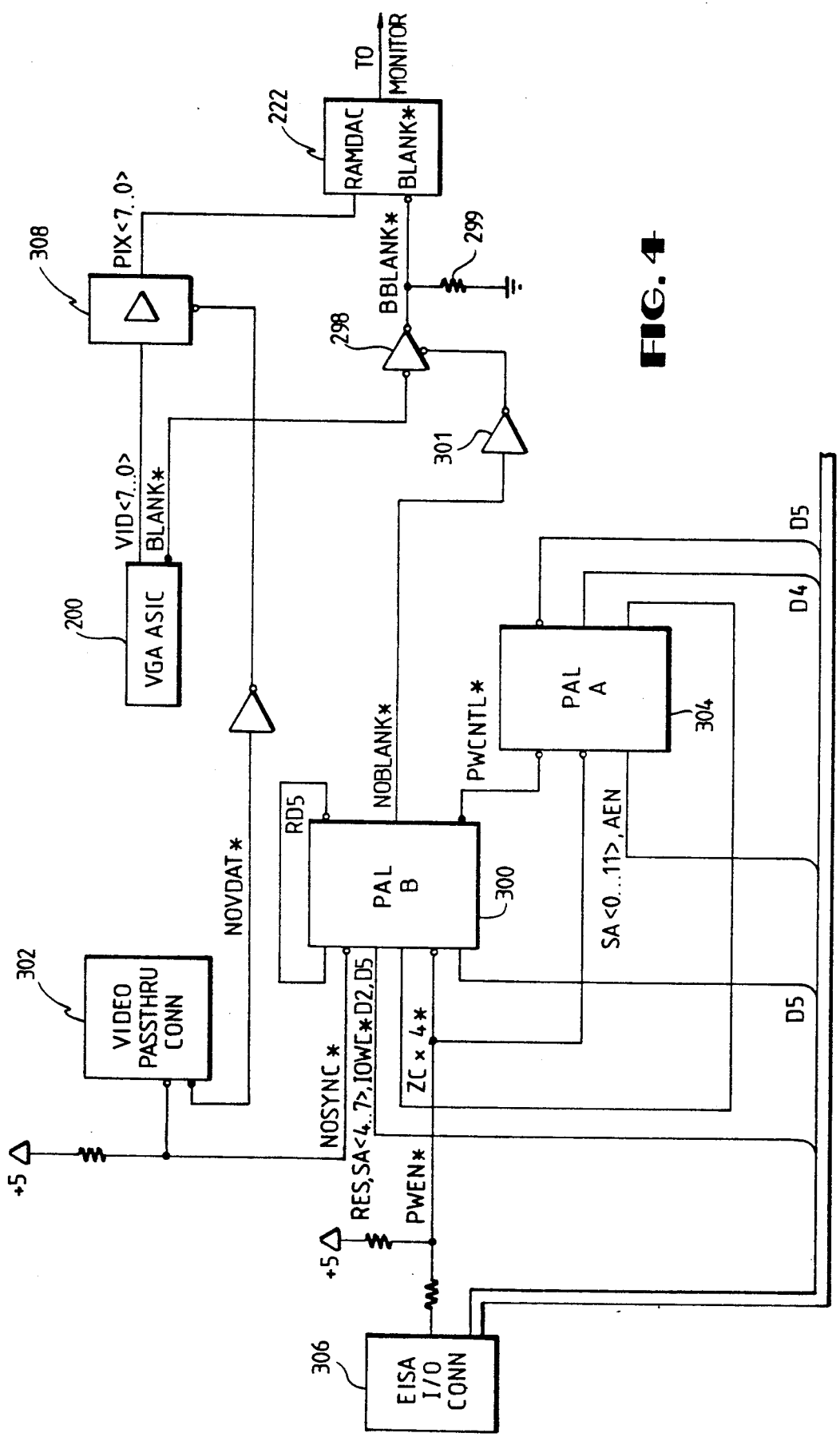
FIGS. 4 and 5 are block diagrams of the circuitry of the preferred first and second embodiments of circuitry for blanking the display of the monitor.

In the first preferred embodiment (FIG. 4), the RAMDAC 222 includes an input referred to as BLANK*. In general when referring to signals in this description, an asterisk (*) after a signal mnemonic indicates that it is logically true when a low voltage level is present and angle brackets with included numbers after a signal mnemonic are used to indicate single or multiple bit positions in a wider logical signal, such as the data or address fields. A signal with an asterisk is also the inverse of the same signal without an asterisk.

When the BLANK* input is activated to a low level, the RAMDAC 222 ceases to send data to the monitor 64, causing it to go blank. When the computer system C is in normal operation, the value input to the BLANK* input is usually an inactive or high level. The VGA ASIC 200 conventionally has a output referred to as the BLANK* signal which is normally coupled to the RAMDAC 222 BLANK* input. The VGA ASIC 200 is responsive to a command from the processor 30 to assert the BLANK* signal.

A signal referred to as NOBLANK* is provided to the input of an inverter 301. The output of the inverter 301 is connected to the tri-state control input of a tri-state buffer 298. The BLANK* signal from the VGA ASIC 200 is connected to the input of the buffer 298 and the output of the buffer 298 is connected to the BLANK* input of the RAMDAC 222. A resistor 299 is connected between the output of the buffer 298 and ground to blank the display if the buffer 298 is in a tri-stated condition for reasons to be explained. The NOBLANK* signal is received from a programmable array logic (PAL) device 300. A PAL is a device that is well known in the art. The NOBLANK* signal is controlled by the PAL 300 according to the following equation:

$$NOBLANK = NOSYNC + PWEN \cdot PWCNTL$$

The NOBLANK* signal is thus asserted under two conditions. The first is when the NOSYNC* signal is asserted low to the PAL 300. The NOSYNC* signal is provided on a video pass through connector 302. The pass through connecter 302 is externally controlled, and the NOSYNC* signal is asserted low when the various synchronization and blanking signals are to be generated externally and provided to the monitor 64 via the pass through connector 302.

The NOBLANK* signal is also generated when the PWEN* or password enable signal and the PWCNTL* or password control signal are asserted low. The PWEN* signal is the output of the keyboard controller 78 associated with screen blanking and set in steps 153 and 157 and cleared in step 179. The PWEN* signal is preferably provided from the keyboard controller 78 via the specially adapted pin on the EISA slot 56.

The PWCNTL* signal is developed by the PAL 300 according to the following latching equation:

$$PWCNTL* = BRDRES* \cdot RWR\_TO\_C84* \cdot PWCNTL + \\ BRDRES* \cdot RD5 \cdot PWCNTL + \\ BRDRES* \cdot RD5 \cdot PWR\_TO\_C84$$

As can be seen from the above equation, PWCNTL* is asserted low, or PWCNTL is asserted high, under three conditions. All of these conditions require, however, that the BRDRES* or board reset signal be inactive, that is, asserted high, with the PWCNTL signal being set low on board reset as defined below. BRDRES* is controlled by the PAL 300 according to the following equation:

$$BRDRES = \overline{RES} + \\ ZCX4 \cdot A7 \cdot /A6 \cdot /A5 \cdot /A4 \cdot \\ IOWC \cdot D2$$

BRDRES will be activated by RES, the reset signal from the computer system C, or by the second term of the above equation, which is a user controlled reset of the video controller 62. The ZCX4 signal is an address decode signal provided by a PAL 304, while the IOWC signal is provided from the EISA bus E to indicate on I/O space write.

The RWR_TO_C84* and the RD5 signals are developed by the PAL 300 according to the following equations:

$$RWR\_TO\_C84 = BRDRES + ZCX4 \cdot A7 \cdot A6^* \cdot A5^* \cdot A4^* \cdot IOWC$$

$$RD5^* = BRDRES \cdot D5^* + BRDRES \cdot D5 + BRDRES^* \cdot D5^*$$

The RWR_TO_C84 signal indicates a board reset condition or a write to port ZC84. The RD5 signal is low during board reset and tracks the D5 from the EISA bus E at other times. Thus the PWCNTL signal is guaranteed low during and after board and thereafter latches the latest value written to bit 5 of I/O port ZC84, the designated control port to activate the keyboard blanking function. A 1 written to the port activates the feature and a 0 disables the feature.

Therefore when the keyboard blanking featured is enabled as indicated by the PWCNTL signal being active high and the NOSYNC signal is inactive low, the NOBLANK signal tracks the PWEN signal provided by the keyboard controller 78. When the NOBLANK* signal is high, that is the NOSYNC* signal is high indicating no external driving, and the keyboard blanking feature is disabled or the feature is enabled and the PWEN* signal is high indicating no blanking, the buffer 298 is active and the BLANK* signal from the VGA ASIC 200 controls the RAMDAC 220. If the NOBLANK* signal is low, either because the NOSYNC* signal is asserted or the keyboard blanking feature is activated and the PWEN* signal is asserted, the buffer 298 is tri-stated. Under these conditions the resistor 299 pulls the BLANK* input of the RAMDAC 220 to a low level, activating blanking.

Thus when the operator activates the keyboard blanking feature in the video controller 62 by writing a one to bit 5 of port ZC84 the keyboard controller 78 can control screen blanking. When the password lock hot key sequence is entered (and enabled), the operator can then depress the hot keys and the display is blanked. Entering the password unblanks the display.

Figure 5:
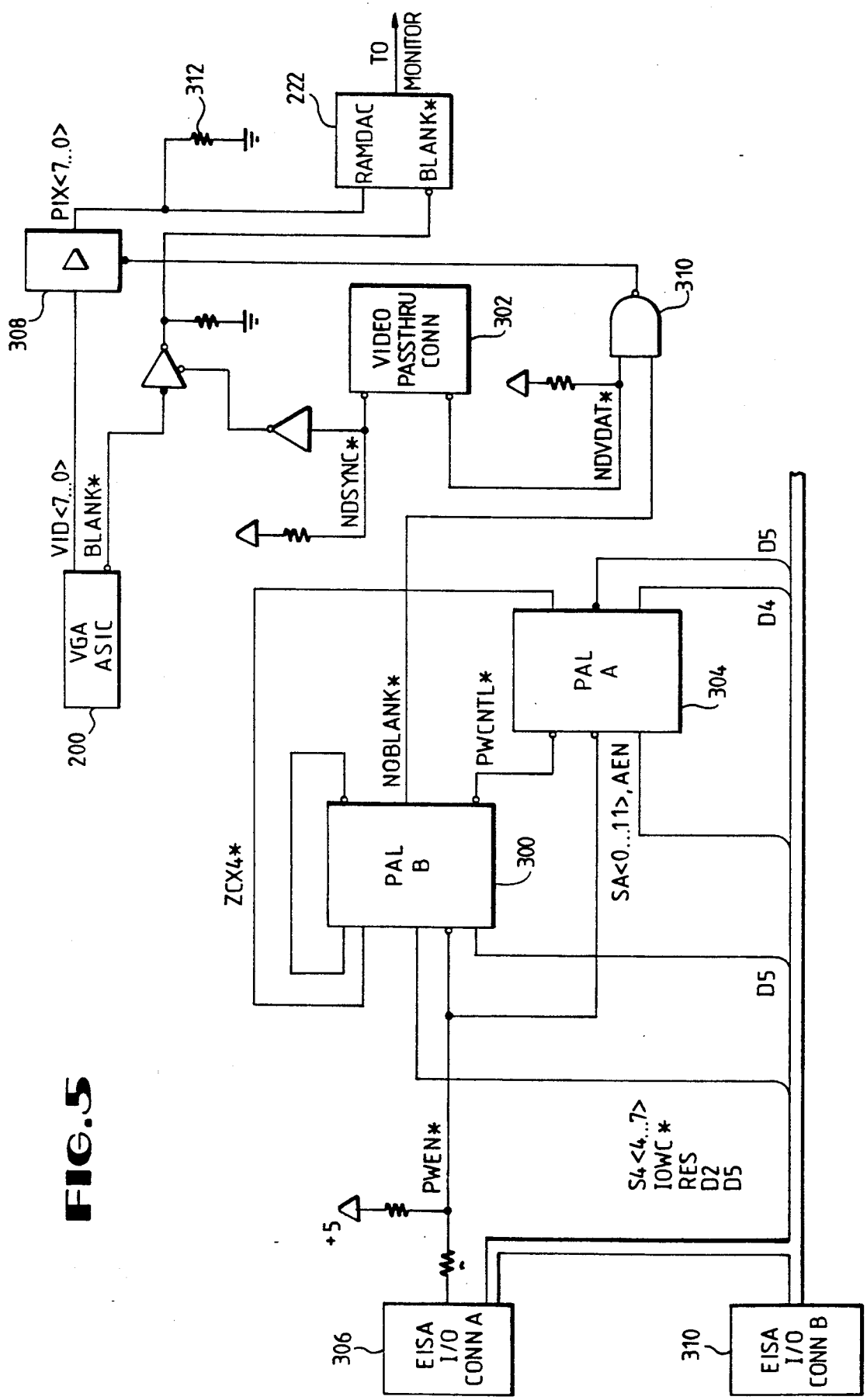

In a second embodiment (FIG. 5), the NOBLANK* signal is not coupled to the RAMDAC 222 BLANK* input. Instead, the NOBLANK* signal is used to disable a video data buffer 308 which supplies video data to the RAMDAC 222. The video buffer 308 may be disabled by either of two signals, NOBLANK* or NOVDAT*. The NOVDAT* signal is provided over the pass through connector 302 and is used to release the video data lines to the RAMDAC 222 for external use. The NOBLANK* signal is generated as previously discussed. The NOVDAT* and NOBLANK* signals are provided as the inputs to a two input NAND gate 310. The output of the NAND gate 310 is provided to the inverted tri-state or output enable input of the buffer 308. Resistors 312 are connected from the video data lines to ground to pull the data lines to a low value when blanking is active and the buffer 308 is disabled. It is to be noted that the BLANK* signal from the VGA ASIC 200 and the NOSYNC* signals still control the blanking of the monitor 64 through the BLANK* input of the RAMDAC 222. Thus the operation of this embodiment is similar to the operation of the embodiment of FIG. 4.

Thus it can be seen that when a predetermined keyboard sequence is developed, in the preferred embodiment the simultaneous depression of the CTRL, ALT and a particular hot key, the keyboard controller 78 stops transmitting characters to the microprocessor 30 and the display can be blanked without any intervention from the microprocessor 30. The microprocessor 30 has only to perform the initial enabling of the feature by setting the password and hot key values and enabling the keyboard blanking feature in the video controller 62 and then the operations are performed solely in the keyboard controller 78 and related logic. The display may be blanked using the blanking circuitry in the RAMDAC 222, or, alternatively, by depriving the RAMDAC 222 of data. It is noted that the password and hot key values can either be present in the CMOS 74 and loaded when the computer system C is performing its power-on self-test or initialization operations or can be loaded by a utility program running on the computer C, which then terminates, leaving the keyboard controller 78 awaiting the hot key sequence to enter password protected and display blanking mode. Thus a program on the computer system C need not be active to enable password protected and display blanked mode and this allows alternate programs which need the microprocessor 30 to be performed. Additionally, the operator can activate display blanking without running a blanking program on the computer system C, allowing blanking on request, even during the operation of other programs.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. A computer system, comprising:
   a bus for transferring information;
   a microprocessor coupled to said bus for receiving and transmitting information and controlling various operations of the computer system;
   a monitor for displaying video information;
   a video controller coupled to said bus and said monitor for providing information received from said bus to said monitor, said video controller including means responsive to a signal for ceasing providing information to said monitor;
   a keyboard for receiving data entry and producing signals representative of key operations;
   keyboard interface means coupled to said bus, said video controller and said keyboard for providing said key operations to said microprocessor over said bus and providing a signal to said means for ceasing providing information, said keyboard interface means including:

means for storing a key operation sequence for entering a monitor blanking mode and a key sequence for exiting monitor blanking mode;

means for scanning the key operations sequence to determine if said monitor blanking mode entry sequence has been performed;

means coupled to said video controller and to said monitoring blanking mode entry sequence scanning means for entering said monitor blanking mode and signalling said video controller to cease providing information to said monitor after determining performance of said monitor blanking mode entry sequence;

means for scanning the key operation sequence after entry into monitor blanking mode for entry of key operation sequence matching said monitor blanking mode exit sequence; and means coupled to said video controller and to said monitor blanking mode exit sequence scanning means for exiting said monitor blanking mode after said monitor blanking exit key sequence has been determined and resuming, providing of information to said monitor.

2. The computer system of claim 1, further comprising:

non-volatile memory means coupled to said bus and accessible by said microprocessor for storing said monitor blanking mode exit sequence and portions of said monitor blanking mode entry sequence; and wherein said microprocessor includes means for reading said stored values from said non-volatile memory and providing said stored values to said keyboard interface means for storage in said keyboard interface means.

3. The computer system of claim 1, wherein said keyboard interface means further includes means for receiving commands from said microprocessor and means for interpreting one of said commands to activate entry into said monitor blanking mode.

4. The computer system of claim 1, wherein said key operations sequence for entering monitor blanking mode includes simultaneously having depressed a plurality of keys on said keyboard.

5. The computer system of claim 4, wherein three keys must be simultaneously depressed.

6. The computer system of claim 5, wherein said three keys are a control key, an alternate key and a character key.

7. The computer system of claim 1, wherein said password controller further includes means for overriding entry into monitor blanking mode if a monitor blanking mode exit sequence or a portion of said monitor blanking mode exit sequence or a portion of said monitor blanking mode entry sequence has not been stored in said keyboard interface means.

8. The computer system of claim 1, wherein said video controller further includes means for blocking provision of said signal to said means for ceasing providing information to said monitor.

9. The computer system of claim 1, wherein said means for entering said monitor blanking mode includes means for ceasing providing key operations to said microprocessor during said screen blanking mode, and wherein said means for exiting said monitor blanking mode includes means for resuming providing key operations to said microprocessor after determining entry of said monitor blanking exit key sequence.

10. The computer system of claim 9, wherein said signals representative of key operations include signals representative of key depression operations and complementary key withdrawal operations, wherein said monitor blanking mode entry sequence comprises a plurality of key depression operations, and wherein said means for exiting said monitor blanking mode further includes means for providing key operations sequence information indicating key withdrawal operations complementary to certain of said key depression operations in said monitor blanking mode entry sequence after determining entry of said monitor blanking exit key sequence and prior to resuming providing key operations to said microprocessor.

11. A method for preventing transfer of information to a monitor of a computer system, the computer system having a microprocessor for controlling operations, receiving key operations, and transferring information; a keyboard on which to perform key operations; a video controller coupled to the monitor and the microprocessor for transferring information from the microprocessor to the monitor; and a keyboard interface means coupled to the microprocessor, the keyboard and the video controller for receiving key operations from the keyboard and providing them to the microprocessor, for receiving commands from the microprocessor, and for transferring signals to the video controller, the method comprising:

scanning the key operations sequence until a predetermined sequence is entered;

entering monitor blanking mode after determining entry of the predetermined sequence and ceasing providing information to the monitor;

scanning the key operations sequence during said monitor blanking mode for an exit sequence; and exiting said monitor blanking mode after determining entry of said exit sequence and resuming providing information to the monitor.

12. The method of claim 11, further comprising:

entering said monitor blanking mode upon receipt of a command from the microprocessor.

13. The method of claim 11, further comprising:

providing key operations to the microprocessor until said predetermined sequence is entered;

ceasing providing key operations to the microprocessor during said monitor blanking mode; and resuming providing key operations to the microprocessor after determining entry of said exit sequence.

* * * * *

UNITED STATES PATENT AND TRADEMARK OFFICE
CERTIFICATE OF CORRECTION

PATENT NO. :   5,173,940
DATED      :   DECEMBER 22, 1992
INVENTOR(S) :  KURT C. LANTZ, ET AL.

It is certified that error appears in the above-identified patent and that said Letters Patent is hereby corrected as shown below:

In Col. 13, Line 23, please delete the "," after "resuming".

Signed and Sealed this

Twenty-sixth Day of October, 1993

Attest:

BRUCE LEHMAN

*Attesting Officer*         *Commissioner of Patents and Trademarks*